United States Patent [19]
Hosford et al.

[11] Patent Number: 5,704,187
[45] Date of Patent: Jan. 6, 1998

[54] COMPOSITE UTILITY POLE

[75] Inventors: Gregory Sander Hosford, Columbia; John Franklin Boozer, III, Pomaria; Robert Ashley Pollard, Jr., Newberry; John Richard Lewis, Jr., Little Mountain, all of S.C.

[73] Assignee: Shakespeare Company, Newberry, S.C.

[21] Appl. No.: 565,113

[22] Filed: Nov. 30, 1995

Related U.S. Application Data

[62] Division of Ser. No. 194,222, Feb. 9, 1994, Pat. No. 5,492,579.

[51] Int. Cl.$^6$ ............................. B32B 31/00; E04C 3/36
[52] U.S. Cl. ...................... 52/736.1; 52/745.19; 52/738.1
[58] Field of Search .................... 52/40, 736.1, 736.3, 52/737.4, 738.1, 745.19; 138/144, 172, 177, 178

[56] References Cited

U.S. PATENT DOCUMENTS

| | | | |
|---|---|---|---|
| 2,791,241 | 5/1957 | Reed | 138/144 |
| 3,429,758 | 2/1969 | Young | 138/144 X |
| 3,481,369 | 12/1969 | Ganahl | 138/144 |
| 3,886,029 | 5/1975 | Poulser | 138/144 X |
| 4,246,732 | 1/1981 | Frehner | 52/309.1 |
| 4,621,662 | 11/1986 | Olry | 138/144 X |
| 5,492,579 | 2/1996 | Hosford et al. | 156/64 |

*Primary Examiner*—Robert Canfield
*Attorney, Agent, or Firm*—Renner Kenner Greive Bobak Taylor & Weber

[57] ABSTRACT

A hollow, tapered, fiber-reinforced plastic utility pole, and a method for making the pole. The pole is designed by a computer-modelling technique that simulates applying resin-coated, reinforcing strands over the outer surface of a mandrel. A plurality of test stations are incrementally spaced from the tip portion to the butt portion of the pole simulated on the mandrel. The thickness-to-diameter ratio must be equal to or greater than an established constant at each station or additional circuits of resin-coated, reinforcing strands deemed to have been applied, as required. One then calculates the stress resistance at each successive station to determine if the acceptable stress is greater than the stress resistance required. Whatever additional circuits of resin-coated, reinforcing strands are necessary are then deemed to have been applied. One then calculates the projected failure load in response to the deflection calculated to occur in response to the rated load at each station to determine if the actual loading to be applied to the pole in relation to the projected failure load at that station is acceptable. The acceptable stress is modified by a binary chopping routine until the relation of the projected failure load and the rated load differ by an acceptable amount. All tests are recalculated until no further changes are required. The pole may then be laid up on a mandrel, and the resin cured to complete the pole.

1 Claim, 8 Drawing Sheets

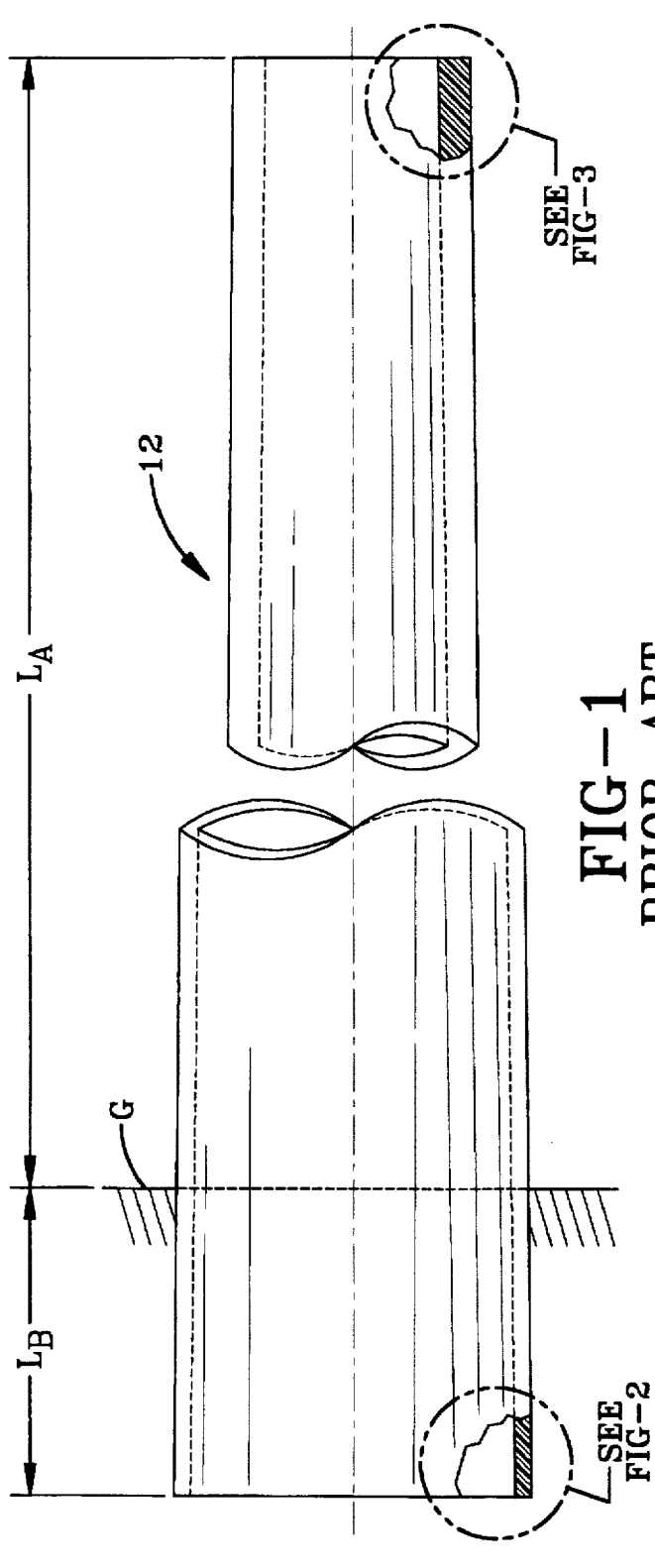

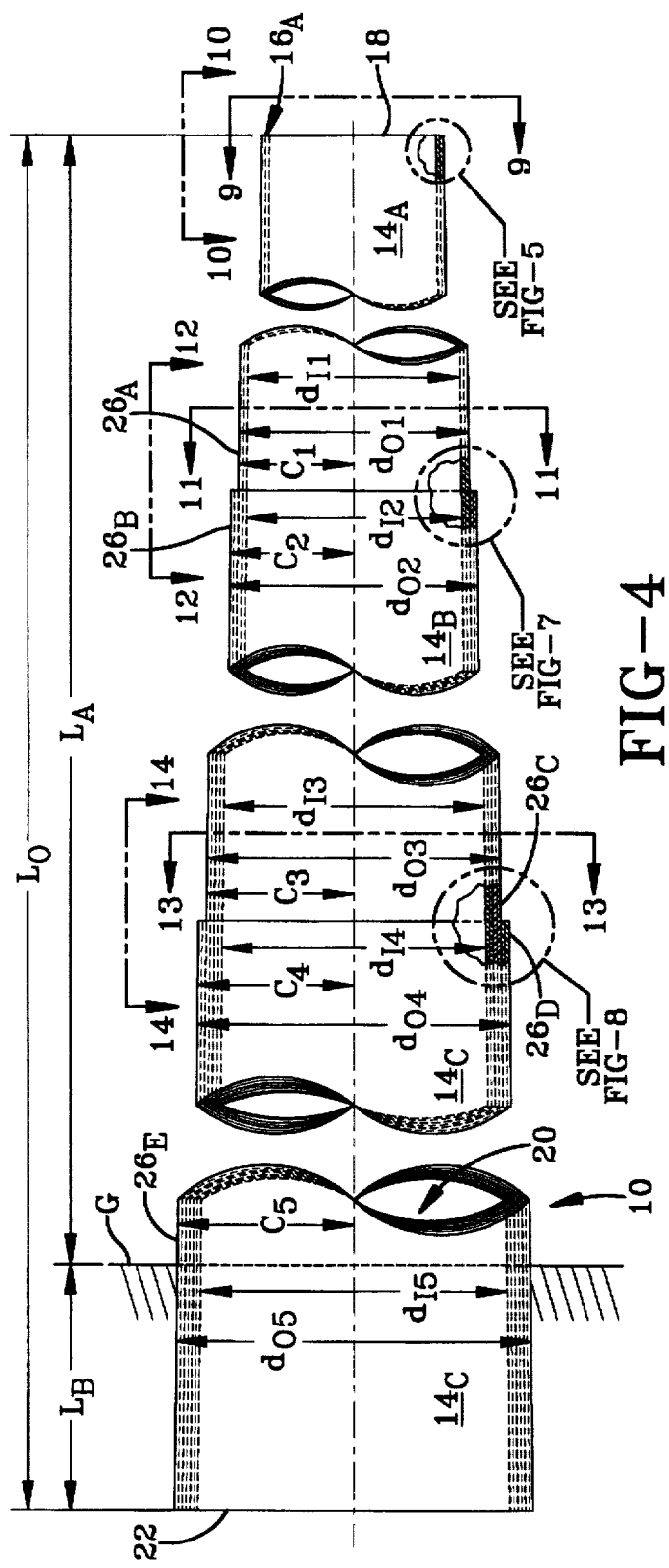

COMPOSITE UTILITY POLE

This application is a division of application Ser. No. 08/194,222, filed Feb. 9, 1994, now U.S. Pat. No. 5,492,579.

TECHNICAL FIELD

The present invention relates generally to utility poles. More particularly, the present invention relates to utility poles made of composite materials such as fiber reinforced plastic (FRP). Specifically, the present invention relates not only to a method for making FRP utility poles with the minimal amount of FRP materials to provide the desired, preselected strength but also to a pole made by such a method.

BACKGROUND OF THE INVENTION

Electrical transmission wires, telephone wires and lighting fixtures are often supported on utility poles. Such poles must be capable of withstanding not only the columnar load applied by the weight of the objects supported thereon but also the bending load imposed by eccentric loading and by wind. As a general rule, wooden, concrete or steel poles have historically been used for this purpose. These poles are all heavy, and each presents some unique disadvantages.

Wooden poles, for example, are subject to rot -i.e.: decomposition from the action of bacteria or fungi -and pest attack --i.e. :wood borers and pecking fowl. Unfortunately, wooden poles are likely to rot at and below the ground surface which can result in a pole collapsing, or toppling, sometimes without warning. To help combat this type degradation the poles are typically treated with chemicals which are intended to prolong the useful life of the wooden pole. However, the chemical preservatives can leach out of the poles and contaminate the local ground water. Moreover, chemical preservatives are not permanent, and it is extremely difficult, if not impossible, effectively to treat wooden poles in the field.

Steel poles are subject to rust and therefore need constant attention and maintenance. The rust proofing compounds used can also have a deleterious effect on the environment. Even if the environmental problems could be solved, steel poles are heavy and are not easily manipulated. Moreover, steel poles are electrically conductive, and even though extreme care may be taken to insulate the electrical fixtures from the pole, routine storm damage can result in the pole becoming electrified. Finally, steel poles are an expensive inventory item.

Concrete poles are even heavier than steel poles. As a result, the expense of transporting and handling concrete utility poles can be excessive. They are, therefore, often constructed in fairly close proximity to the erection site. Concrete poles, like the aforementioned wooden and steel poles, are also subject to the ravages of the environment, particularly the freezing and thawing cycles which exist across massive geographic areas of the U.S. ..

Fiber reinforced plastic (FRP) poles have been suggested as an excellent replacement for wooden, steel and/or concrete poles because they are not as subject to the same deficiencies. For example, FRP composite poles provide a basic electrical insulation level that is greater than wooden, steel or concrete poles, and that basic electrical insulation level is maintained over the life of the FRP pole. Moreover, FRP utility poles provide an extremely favorable strength-to-weight ratio. FRP utility poles are generally comprised of several layers of fiber reinforced resin laminate. The fibers normally employed are glass, graphite, boron or other exotic materials, or combinations thereof, which have a Young's modulus on the order of at least about $10 \times 10^6$ psi ($6.9 \times 10^{10}$ $N/m^2$)—well sufficient to provide the hoop strength and stiffness necessary to prevent buckling and circular deformation of the shaft when under the loads typically imposed on utility poles.

FRP poles are also environmentally safe inasmuch as there is no leaching of chemicals into the soil. FRP poles, unlike their wooden counterparts do not require initial, or future, treatment with chemical preservatives. Conversely, the FRP composite utility poles possess an inherent resistance to attack from various chemicals that may be typically found in the soil.

However, the prior art FRP poles have proven to be too expensive. Typically, FRP poles are made by laying up resin coated fiberglass, or other high modulus strands, on a tapered mandrel. When the reinforcing filaments are wound on a tapered mandrel, the resulting tapered, tubular pole has a greater wall thickness at the tip portion of the pole than it does at the butt portion. Tubular FRP poles fabricated in this manner do possess high cantilever strength through the tip portion, where the wall thickness is greater and the outside diameter is smaller. However, in order to obtain tubular poles that have sufficient cantilever strength near the butt portion, excessive amounts of materials are amassed in the tip portion, thus unnecessarily increasing the cost and weight of the pole.

SUMMARY OF THE INVENTION

It is, therefore, a primary object of the present invention to provide an improved utility pole having a contour that convergingly tapers from the base, or butt, portion to the tip portion of the pole without significantly decreasing the wall thickness along the butt portion to the detriment of the pole strength or increasing the wall thickness along the tip portion in excess of what is required to provide the desired pole strength along the overall length of the utility pole.

It is another object of the present invention to provide an improved, tapered, lightweight, FRP utility pole, as above, that is in the range of from approximately one third (⅓) to one half (½) the weight of the same length pole constructed with wood, steel or concrete.

It is a further object of the present invention to provide an improved, tapered, lightweight, FRP utility pole, as above, that includes successively concentric FRP layers, some of which have a length less than the total length of the pole.

It is yet another object of the present invention to provide an improved utility pole, as above, having a wall thickness to pole diameter ratio that is greater than, or equal to, 0.015 and a beam strength, at any cross section along the length of the pole, that will resist a predetermined, allowable stress.

It is also a primary object of the present invention to provide a method for fabricating an FRP utility pole having the foregoing characteristics.

These and other objects of the invention, as well as the advantages thereof over existing and prior art forms, which will be apparent in view of the following detailed specification, are accomplished by means hereinafter described and claimed.

A tapered, tubular FRP utility pole fabricated in accordance with the concepts of the present invention has a plurality of fiber-reinforced plastic layers applied, as required, along a determinable length of the pole in a manner that optimizes the columnar as well as the cantilever strength of the pole and minimizes the amount of material used.

Because an understanding of the terminology employed is critical to an understanding of the present invention, it should be understood that the apparatus which simultaneously encases the outer periphery of the mandrel with a plurality of resin-coated, reinforcing fibers, or strands, does so by relative axial movement between a mandrel and a head which directs the resin-coated, reinforcing strands onto the mandrel. That relative movement between the head and the mandrel which applies a single circumferential application of the reinforcing strands along the length of the mandrel is deemed a "pass", or "traverse". When the relative movement is reversed to effect a second pass, or traverse, the two passes are deemed to constitute one "cycle", or "circuit". Those one or more circuits, or cycles, which reciprocate through a common length along the mandrel, including any and all underlying portions of previously applied circuits, result in a "layer" of fiber-reinforced plastic.

With this background it can be stated that at least one, and perhaps more, FRP circuit normally extends the complete length of the pole. Other circuits will normally extend from the base, or butt, portion of the pole for successively lesser lengths to terminate at predetermined distances from one end or the other of the pole. The resulting shorter circuits, or cycles, combine with the underlying portions of previously applied circuits to provide additional layers, and those layers do not contribute to an unnecessarily thicker wall along the tip portion in comparison to the thickness of the wall along the base, or butt, portion.

According to prior art techniques widely known and used by the industry, one or more strands, or filaments, of the reinforcing material is wound onto the mandrel, beginning at one end thereof, in a helical configuration of one hand, and one or more successive strands, or filaments, is wound, beginning at the other end thereof, onto the mandrel in a helical configuration of opposite hand. These steps are thereafter repeated until the mandrel is covered with the desired number of layers. Thereafter, the member is cured.

A representative apparatus for making FRP members is disclosed in U.S. Pat. No. 4,089,727 issued on May 16, 1978, in the name of P. H. McLain and is owned by the assignee of the present invention. The apparatus disclosed in the '727 patent is described as applying a relatively narrow ribbon of resin-coated material on each pass, but by modifying the head a sufficient number of reinforcing strands may be simultaneously applied circumferentially about the mandrel in order to cover the mandrel completely in only one pass. Successive passes, then, effect only the thickness of the FRP member being made.

During the winding operation there is, therefore, relative rotational—as well as relative longitudinal—movement between the mandrel and the winding head.

It is possible to rotate the winding head while rotating, or not rotating, the mandrel. It is also possible to rotate the mandrel while not rotating the winding head. Similarly, the relative longitudinal movement between the winding head and the mandrel can be effected by movement of either, or both, said members. All variations effect the desired relative rotation and translation between the winding head and the mandrel.

The concepts with respect to which the present invention is achieved are not limited to adoption with any particular means for effecting relative longitudinal and/or rotational movement. As such, and purely for the sake of simplicity, the prior art and the present invention shall both hereafter be explained in terms of the situation where the winding head does not rotate but is moved longitudinally along the mandrel and the mandrel does rotate but does not itself move longitudinally.

As the mandrel is thus rotated, and the winding head is moved longitudinally therealong, a plurality of reinforcing strands may be laid onto virtually the entire outer periphery of the mandrel rearwardly of the head as the head traverses longitudinally along the mandrel.

In accordance with the present invention the length of each layer is predetermined by comparing the cantilever strength with the columnar strength of the layer at preselected test stations spaced longitudinally along the length of a computer-modelled pole.

Equations for mathematically calculating the cantilever strength of a tubular pole as well as the critical columnar loading thereof both rely on the moment of inertia of the column and the modulus of the material from which the pole is fabricated. The dimensions of the pole must also be such that the ratio of the wall thickness to the inside diameter of the pole is equal to, or greater than, 0.015.

Once this ratio of wall thickness to inside diameter is satisfied, the stress resistance at the test station is calculated to ensure that a predetermined maximum stress is not exceeded. If the calculated stress exceeds an acceptable, predetermined, maximum stress, another cycle—i.e.: a to-and-fro pass, or traverse—of the resin-coated, reinforcing strands is provisionally added, and the new stress resistance level is calculated. Only when the two tests are satisfied does the location of the test station move incrementally closer to the butt of the computer-modelled pole. If the tests are also satisfied at the next test station, the test station is moved incrementally to the next successive test station, and when any additional material is required another circuit is provisionally added and that test section is retested. This process is repeated for the length of the proposed pole and results in a tapered tubular configuration that will have a plurality of FRP layers, many of which extend along less than the total length of the modelled pole.

Thereafter the tip deflection of the computer-modelled pole is evaluated to determine a projected failure load. Differences between the rated load and the projected failure load of more than a preselected modest value ($\epsilon$)—which may typically be on the order of about one hundred (100) pounds—determine incremental adjustments to the maximum allowable stress. The maximum allowable stress is adjusted by successive iterations, and comparison, of the rated load with respect to the projected failure load, at all stations, until such time as the rated loading $F_R$ is less than the projected failure loading $F_P$ and the projected failure loading $F_P$ is less than the rated loading $F_R$ plus the preselected modest value $\epsilon$. That is, $F_R < F_P < F_P + \epsilon$. This sequential recalculation—termed binary chopping—eventually converges on the most desirable number and length of circuits to provide the desired failure load with the minimum weight of the pole. The foregoing procedure may be readily accomplished on a computer for each selected station, and an actual pole may then be constructed in conformity with the computer-modelled result. Once the number of layers and their lengths are established for a particular length of pole to be subjected to a specific load, that pole can be readily replicated at any future time without the necessity to repeat the computer-modelling.

A lightweight FRP utility pole constructed in accordance with the present invention will provide structures that are in the range of one third (⅓) to one half (½) the weight of the same length pole constructed with wood, steel or concrete. Moreover, a pole constructed in accordance with the present invention will be environmentally friendly inasmuch as none of the materials used to fabricate the pole will leech into the soil. Also, the poles will not need initial or future treatment with preservatives.

These FRP poles will have a basic, electrical insulating characteristic that is more favorable than provided with wooden, concrete or steel poles. This basic electrical insulating characteristic is maintained over the life of the pole. The FRP poles have a better resistance to attack from the chemicals that may already be in the soil and resistance to attack by wood pests such as wood borers, fungus, bacteria or pecking fowl is also provided.

The pole is laid-up on a tapered mandrel by applying successive circuits of resin-coated, fiber reinforcing strands in which the fibers are wound at approximately a fifteen degree (15°) helix. Each circuit is comprised of two passes, or traverses, of the resin-coated, fiber reinforcing strands, with each successive traverse applying the reinforcing strands in a helix disposed in an opposite hand than that resulting from the previous traverse. The required support strength is a known value such that the stress in the pole can be calculated at any location along the length of the pole by using the well known formula:

$$s = \frac{Mc}{I}$$

as hereinafter explained in detail.

Because the maximum allowable stress for the FRP material is known, another circuit of FRP can be added between the butt portion and the test station at which the thickness of the layer was calculated to be insufficient to pass both tests. This process is continued at successive, predetermined test stations—i.e. :typically every six inches (15.24 cm)—along the length of the pole. It has been found, for example, that a thirty-five foot (10.67 m) pole which possess mid-range strength (when compared to the well known, fifteen classes of strength for wooden poles) requires the application of successively shorter circuits to provide three distinct layers.

In order to test the utility poles for columnar strength as well as cantilever strength it has been found that one can predict the cantilever failure load without testing to failure by using pole deflection dam, as will also be hereinafter described in detail.

To acquaint persons skilled in the arts most closely related to the present invention, one preferred embodiment of an FRP utility pole that illustrates a best mode now contemplated for putting the invention into practice is described herein by, and with reference to, the annexed drawings that form a part of the specification. An exemplary utility pole as well as the method of making such a pole are described in detail without attempting to show all of the various forms and modification in which the invention might be embodied. As such, the embodiment shown and described herein is illustrative, and as will become apparent to those skilled in these arts, can be modified in numerous ways within the spirit and scope of the invention; the invention being measured by the appended claims and not by the details of the specification.

BRIEF DESCRIPTION OF THE DRAWINGS

FIG. 1 is a side elevation, partly broken away and segmented, of a prior art, FRP, utility pole;

FIG. 2 is an enlarged portion of FIG. 1 taken at the area designated "SEE FIG. 2" in FIG. 1;

FIG. 3 is an enlarged portion of FIG. 1 taken at the area designated "SEE FIG. 3" in FIG. 1;

FIG. 4 is a side elevation, partly broken away and segmented, of a utility pole incorporating the present invention;

FIG. 5 is an enlarged portion of FIG. 4 taken at the area designated "SEE FIG. 5" in FIG. 4;

FIG. 6 is an enlarged transverse section of FIG. 5 taken substantially along line 6—6 of FIG. 5;

FIG. 7 is an enlarged portion of FIG. 4 taken at the area designated "SEE FIG. 7" in FIG. 4;

FIG. 8 is an enlarged portion of FIG. 4 taken at the area designated "SEE FIG. 8" in FIG. 4;

DESCRIPTION OF AN EXEMPLARY EMBODIMENT

Figure 9:
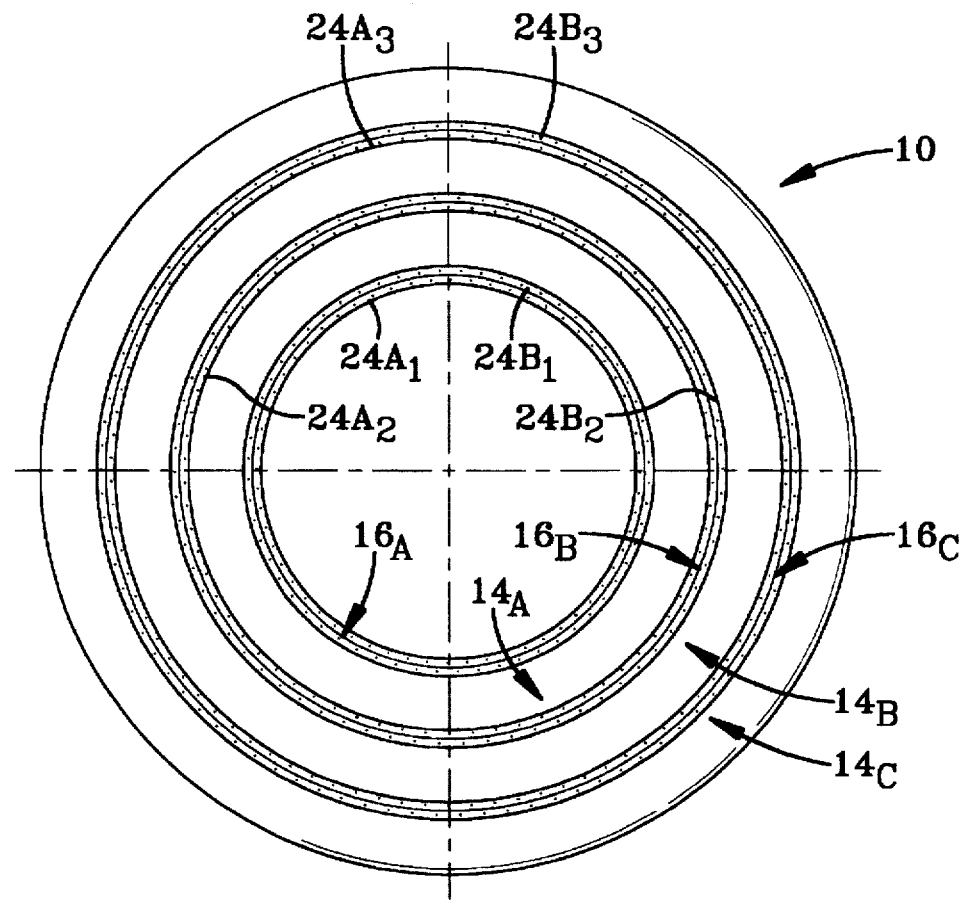
FIG. 9 is an enlarged, end elevation taken substantially along line 9—9 of FIG. 4 and depicting a view from the tip, or top, portion of the pole toward the base, or butt, portion.
Figure 10:
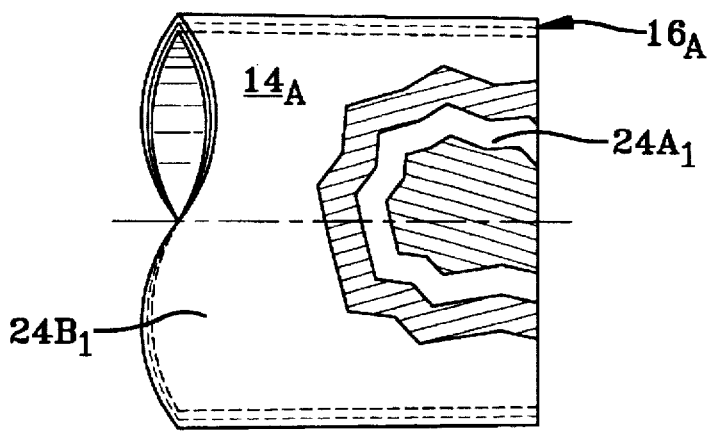
FIG. 10 is an enlarged side elevation, partly broken away, taken substantially along line 10—10 of FIG. 4.
Figure 11:
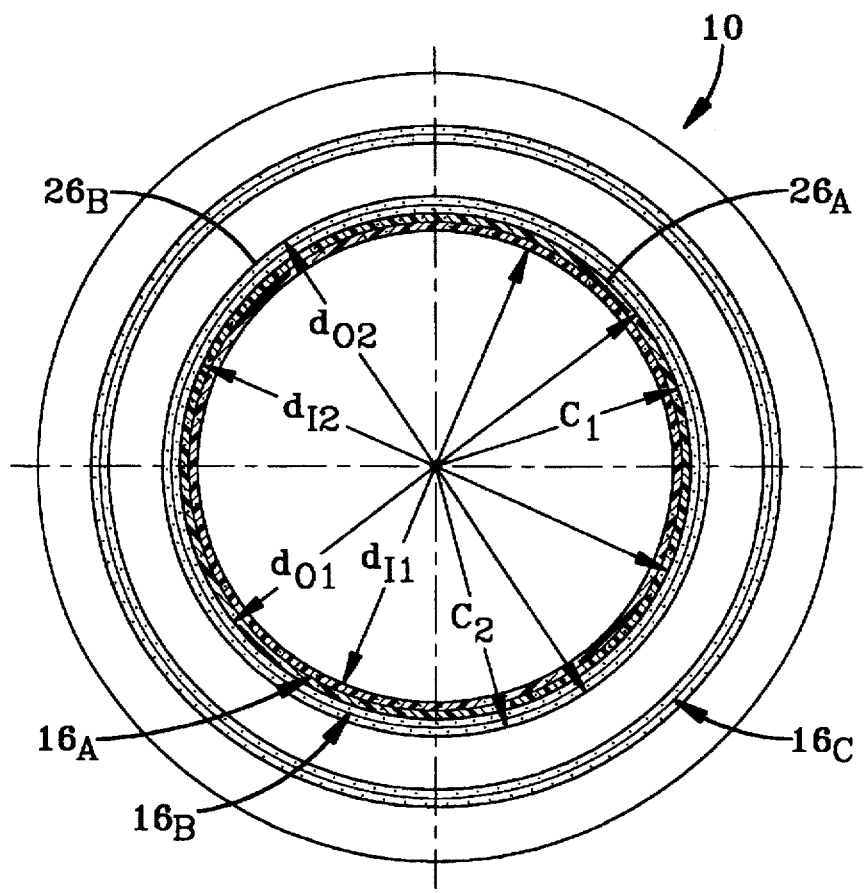
FIG. 11 is an enlarged, transverse section taken substantially along line 11—11 of FIG. 4.
Figure 12:
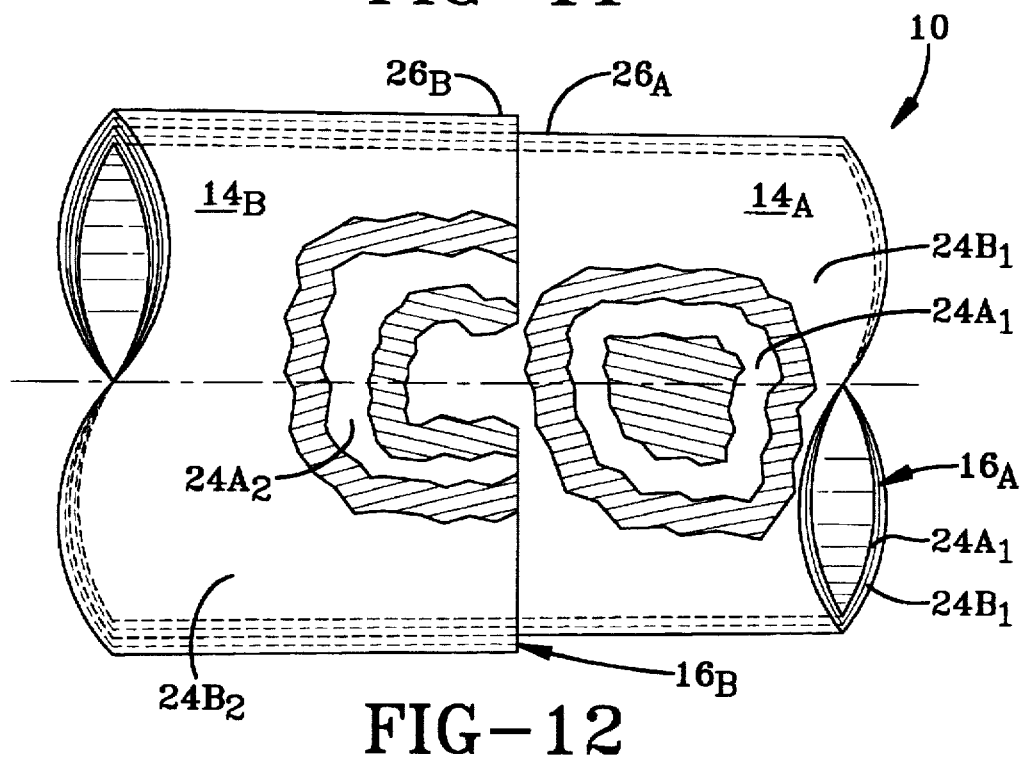
FIG. 12 is an enlarged, side elevation, partly broken away, taken substantially along line 12—12 of FIG. 4.
Figure 13:
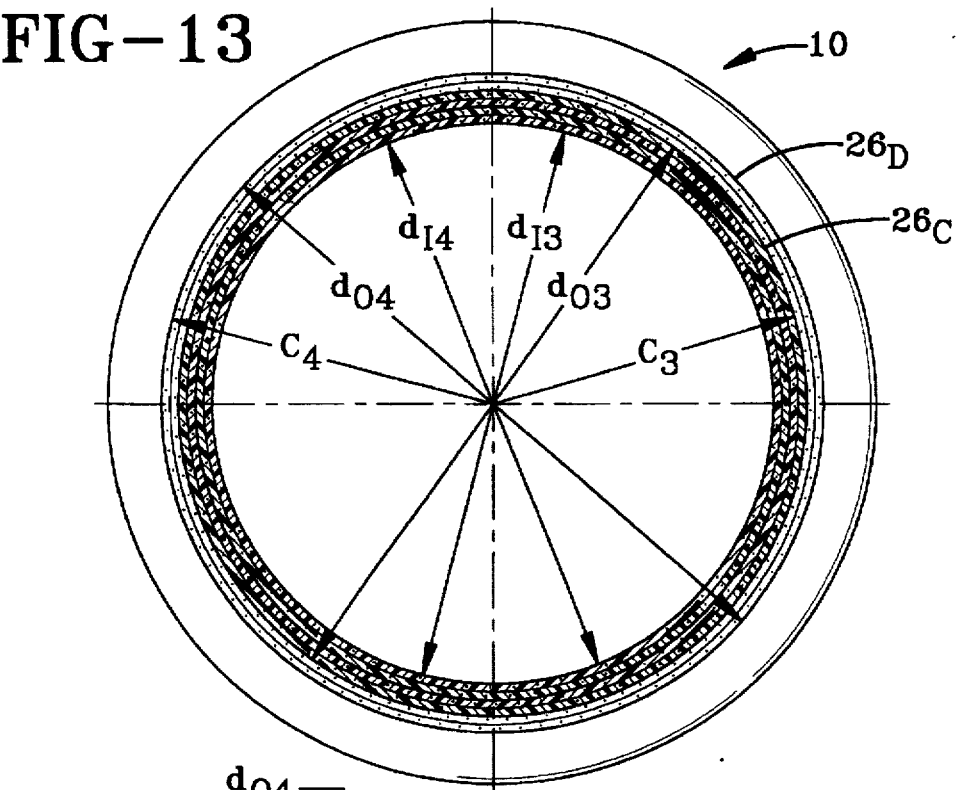
FIG. 13 is an enlarged, transverse section taken substantially along line 13—13 of FIG. 4.
Figure 14:
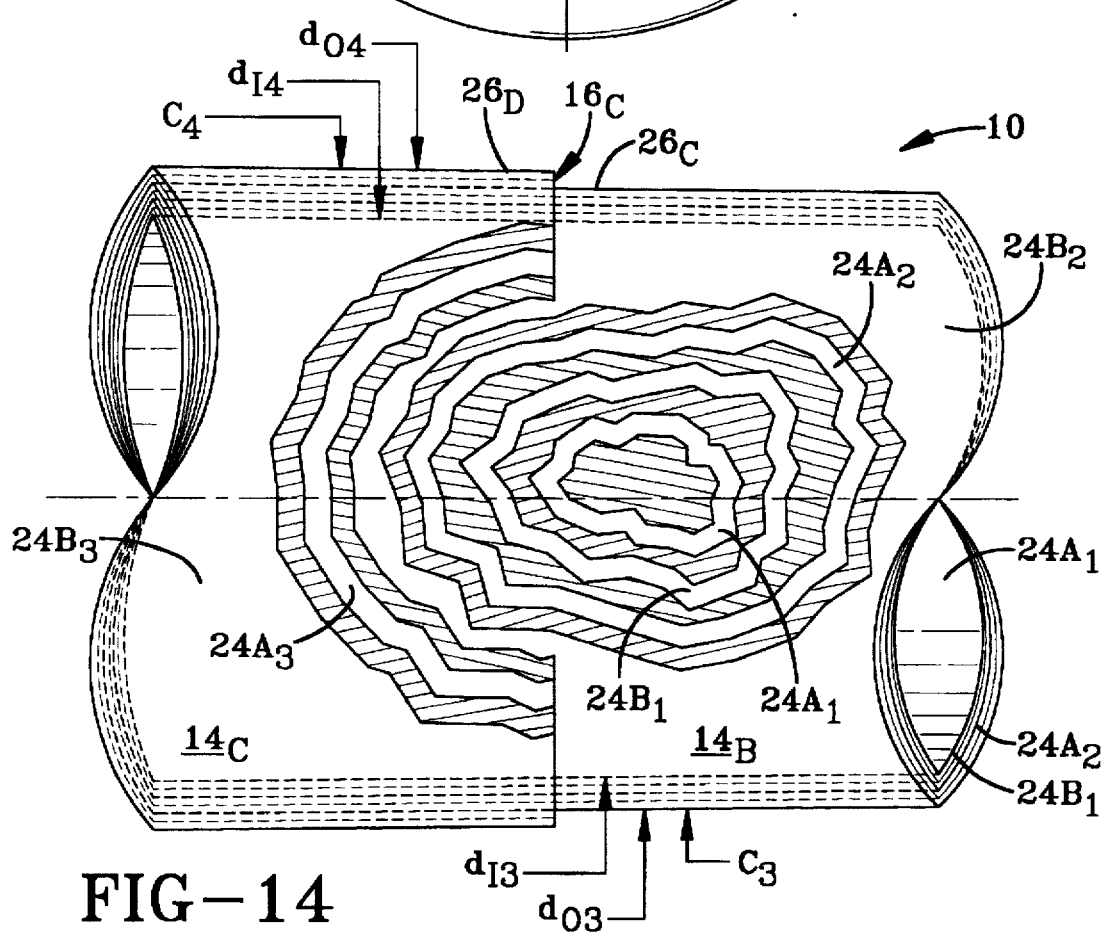
FIG. 14 is an enlarged side elevation, partly broken away, taken substantially along line 14—14 of FIG. 4.

One representative form of a fiber-reinforced plastic utility pole embodying the concepts of the present invention is designated generally by the numeral 10 on FIGS. 4 through 15 of the accompanying drawings. However, with initial reference to FIG. 1, a representative, prior art, utility pole 12 is constructed to have a length "$L_A$" above ground level "G" and a length "$L_B$" below ground level "G". It will be observed that the thickness "$T_1$" of the tip portion depicted in FIG. 3 is greater than the thickness "$T_2$" of the butt portion depicted in FIG. 2. This is representative of prior art FRP utility poles.

The improved utility pole 10 is also constructed of fiber reinforced plastic (FRP), and it may also have a length "$L_A$" above ground level "G" and a length "$L_B$" below ground level "G". The pole 10 is, however, distinctly comprised of a plurality of layers 14—three layers $14_A$, $14_B$ and $14_C$ are shown in the representative pole depicted in FIG. 4. Each layer 14 is, in turn, comprised of one or more full, or partial, circuits 16. In the representative pole 10, layer $14_A$ extends along the tip portion 18 of pole 10 and comprises a portion of circuit $16_A$. If required, as hereinafter explained, one or more additional circuits might be included in layer $14_A$.

Layer $14_B$ is comprised of the medial portion 20 of circuit $16_A$ in conjunction with a portion of circuit $16_B$, or any other circuit 16 which might overlie the medial portion 20 of circuit $16_A$. Layer $14_C$ is comprised of not only the entirety of circuit $16_C$ but also that portion of both circuits $16_A$ and $16_B$, as well as any and all other circuits which underlie circuit $16_C$. Here, too, one or more additional circuits 16 might be coextensive with circuit $16_C$, if such circuits are mathematically determined to be required, as is hereinafter more fully explained. Each circuit 16 is comprised of two passes, or traverses, 24A and 24B of resin-coated, reinforcing strands.

As previewed in the preceding paragraph, and as will appear in the detailed description which follows, a particular structural member, component or arrangement may be employed at more than one location. When referring generally to that type of structural member, component or arrangement a common numerical designation shall be employed. However, when one of the structural members, components or arrangements so designated is to be individually identified it shall be referenced by virtue of a letter suffix employed in combination with the numerical designation employed for general identification of that structural member, component or arrangement. Thus, there are two passes—one applied in each direction—used to lay a circuit 16 of resin-coated, reinforcing strands, and those passes are generally identified by the numeral 24, but the specific, individual passes—one in either direction—are, therefore, identified as 24A and 24B, respectively, in the specification and on the drawings.

On the other hand, when the structural members, components or arrangements are similar, but not exactly the same, a common numerical designation shall still be employed, but when the similar members, components or arrangements so identified are to be specifically designated, they shall be referenced by virtue of a letter subscript employed in combination with the numerical designation employed for general identification of that structural member, component or arrangement. Thus, there are similar, but distinct, circuits, or cycles formed by the two passes 24A and 24B. The circuits, or cycles, are generally identified by the numeral 16 but the specific, individual circuits are, therefore, identified by the alphanumeric designations $16_A$, $16_B$ etc. in the specification and on the drawings.

These same alphanumeric conventions shall be employed throughout the specification.

Figure 16A:
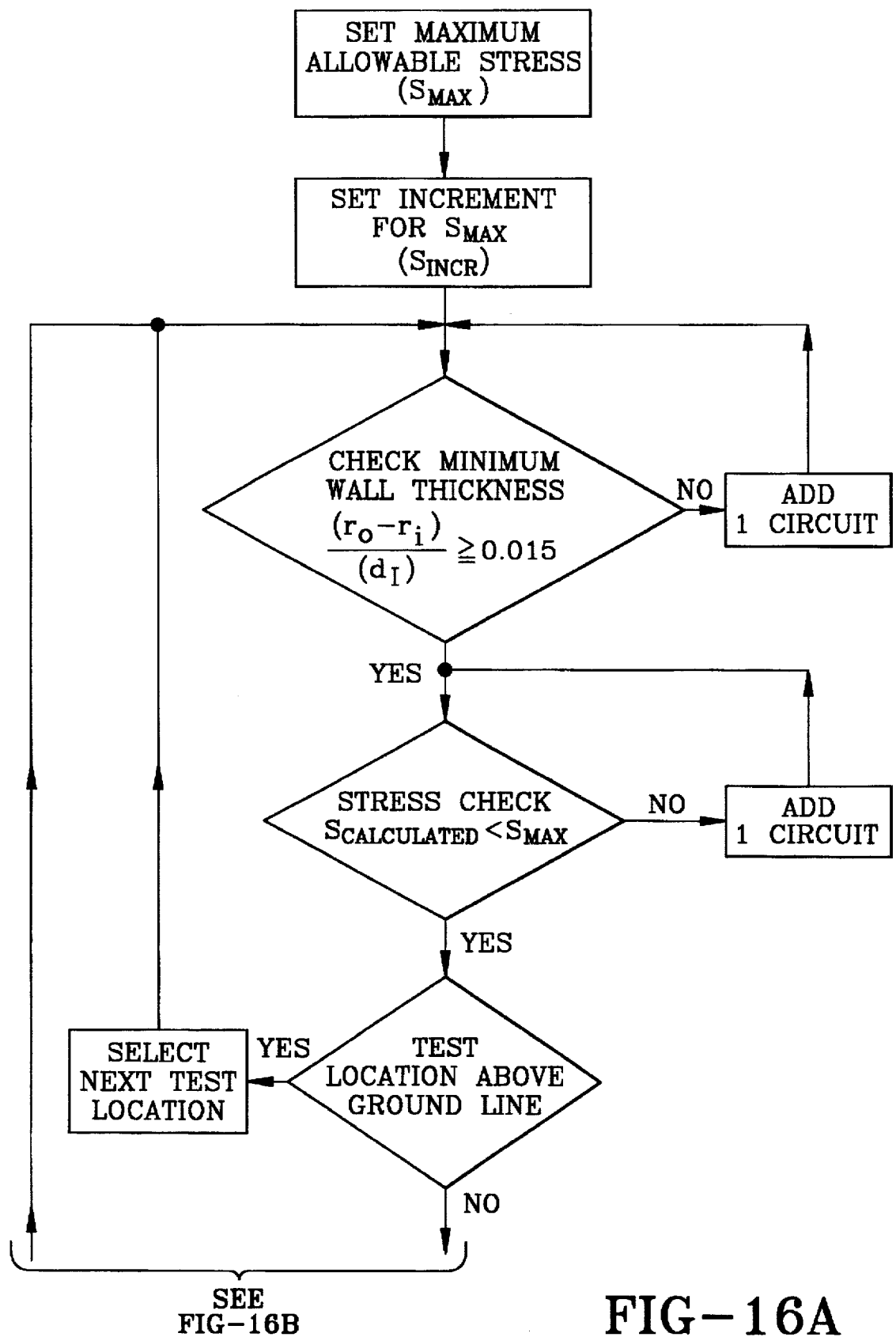
FIG. 16A is a portion of a flow chart for an algorithm that may be used in computer-modelling a hollow utility pole that is particularly adapted to be manufactured from a composite FRP in conformity with the concepts of the present invention; and, FIG. 16B is the remaining portion of the flow chart, a portion of which is depicted in FIG. 16A, the FIGS. 16A and 16B being joined as depicted on those two FIGS.
Figure 16B:
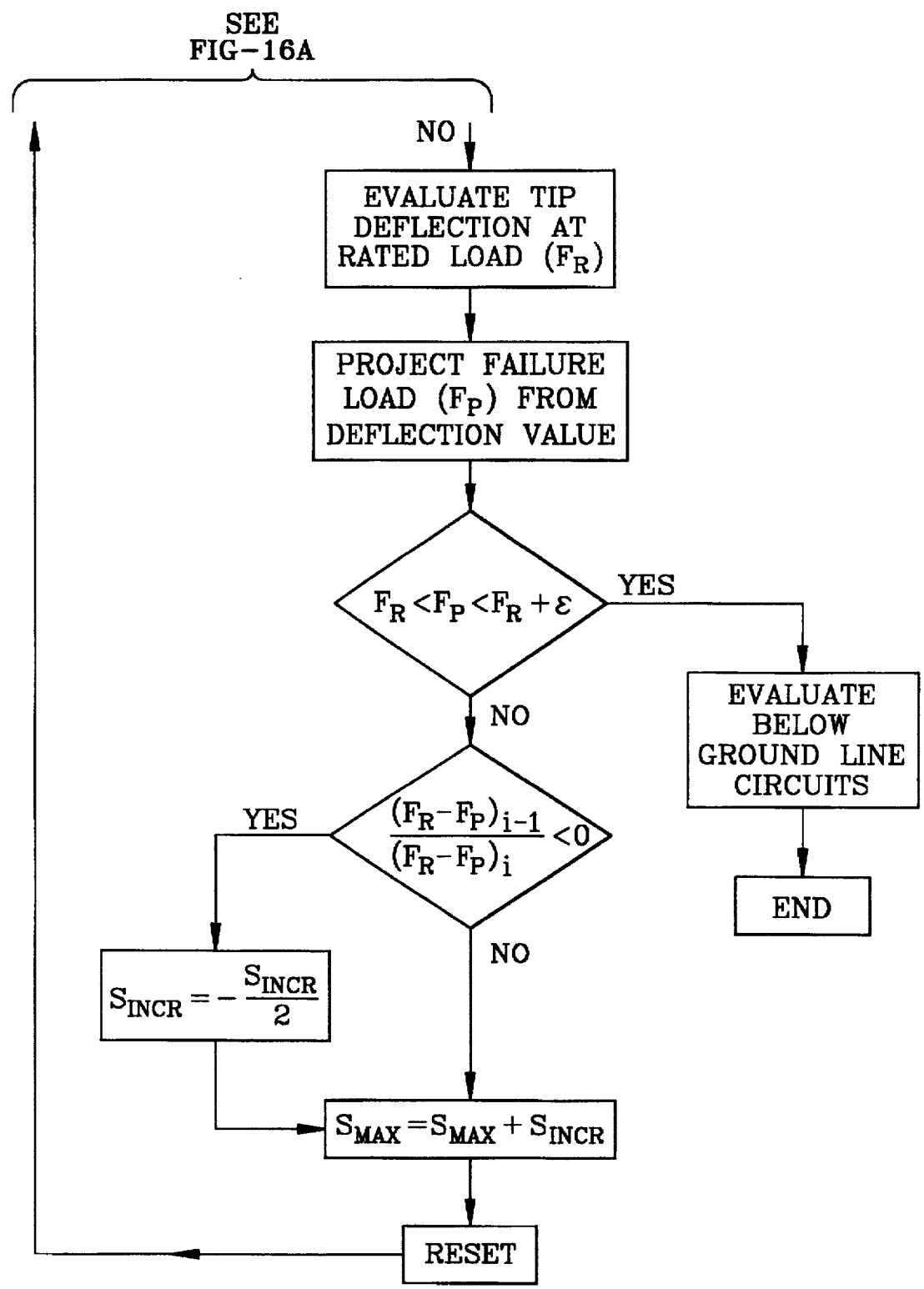

Although the structure of the pole 10 is quite unique, the full flavor of its novelty is more likely to be appreciated if one considers how the number of layers are determined as well as how the length of the various circuits which combine to form those layers were determined. To best understand that process one must refer to FIG. 16 and remember through the description that follows that the number and length of the successive circuits are determined by computer-modelling, the algorithm of which is represented by the flow chart in FIG. 16.

The flow chart begins by arbitrarily selecting an original, maximum allowable stress "$S_{max}$". It should be recognized that this value need not bear any realistic resemblance to what a true maximum allowable stress will eventually prove to be, as will hereinafter be more fully explained. Thus, one might select forty-thousand pounds per square inch (40,000 psi), which is fairly certain to exceed a realistic value for an FRP member.

The value of the original incremental adjustment "$S_{incr}$" by which the originally selected maximum allowable stress is to be adjusted, again as will be hereinafter more fully explained, is also selected. The chosen value for the initial incremental adjustment is selected to be sufficiently large that the binary chopping employed in the computer-modelling procedure will not take an overly extended period of real time to run but yet be sufficiently small that at least two test cycles will be required before the first binary chop is effected. In addition, if the maximum stress is initially selected to be higher than reasonably anticipated for the ultimately determined maximum stress, the sign of "$S_{incr}$" should be negative. As such, an original value for "$S_{incr}$" might equal a minus eight thousand pounds per square inch (−8,000 psi). Note that these selections, while arbitrary in the sense that they may not prove to be realistic, are intelligently chosen such that the values preferably initiate the computer-modelling by choosing an overly large "$S_{max}$" and a related value for "$S_{incr}$" to allow effective binary chopping during subsequent stages of the computer-modelling routine.

Once these initial values are selected the ratio of the wall thickness to the inside diameter (generally designated as the thickness/diameter ratio) for the pole 10 is compared to a predetermined minimum value at a sequential series of test stations 26 (FIG. 4). As a general rule, it has been determined that the ratio required for an FRP utility pole is equal to, or greater than, 0.015.

The wall thickness is determined by finding the difference between the outer radius "$r_o$" of the wall and the inner radius "$r_i$" of the wall. That is, the thickness "t" may be mathematically expressed as $$t = (r_o - r_i) \quad (1)$$

This thickness is divided by the inner diameter "$d_i$" of the wall at that test station 26 for which the ratio is being determined. Hence, the ratio "R" may be mathematically calculated by the following equation:

$$R_c = \frac{r_o - r_i}{d_i} \quad (2)$$

If the calculated ratio $R_C$ is less than the minimum required ratio $R_R$, it is not acceptable, and another circuit 16 of FRP is deemed to be applied from the butt portion 22 of the pole 10 to the test station 26 at which $R_C$ is being considered. Thereafter, the ratio is recalculated. If the ratio is still not acceptable, an additional circuit is considered to have been added. This process is repeated until the $R_C$ is equal to, or greater than 0.015.

In constructing a pole 10 having a significant overall length $L_O$—i.e.: the length $L_A$ above ground level "G" plus the length $L_B$ below ground level "G"—it has been found that seldom does only a single circuit 16 (to form a single, full length layer 14) provide an acceptably strong pole. That is, it is seldom, if ever, satisfactory to provide the same number of circuits at all test stations 26 along the full length of the pole to provide the necessary strength for a pole. To the contrary, it has been determined that a plurality of layers 14 are generally required to provide the required thickness-to-diameter ratio $R_R$.

After the required ratio $R_R$ has been established at a test station, the pole 10 is analyzed to determine if the calculated stress $S_{calc}$ at the test station 26 will equal or exceed the maximum stress $S_{max}$ to withstand a cantilever load "F". The stress $S_{calc}$ can be determined from the following equation:

$$S_{calc} = \frac{Mc)}{I} \quad (3)$$

where:

M=the moment produced by the rated load $F_R$;
c=the distance from the neutral axis (centerline of the pole) to the outer surface of the pole, where the stress is maximum; and, I=equals the moment of inertia—which is proportional to the difference between the outer diameter $d_o$, raised to the fourth power, and the inner diameter $d_i$, raised to the fourth power, for an annular cross section.

That is:

$$I = \frac{\pi}{64}(d_o^4 - d_i^4) \tag{4}$$

By virtue of having arbitrarily chosen an original $S_{max}$ well in excess of what would have been reasonably anticipated, it is expected that $S_{calc}$ will be well below the originally selected $S_{max}$ on the initial run of the computer-modelling program at each test station 26 above ground level "G". If not, an additional circuit will be added, as required.

In general, then, the stress will normally be minimum at the tip portion 18 and increase as one considers the results at test stations 26 progressively closer to the butt portion 22. A realistic structural design for the pole can be achieved, for example, by placing the test stations at incrementally spaced locations along the length of the pole at approximately six inch (15.24 cm) intervals. When either the thickness ratio R is equal to or less than 0.015 or the calculated stress $S_{calc}$ exceeds the predetermined, maximum acceptable value $S_{max}$, another circuit 16 is added from the butt portion 22 to the test station 26 where the calculation was made.

The calculations are repeated and required circuits 16 are added until the predetermined values required by the test formulas are achieved.

Tied in with the evaluation of the deflection when the pole is subjected to deflection under the rated load $F_R$ is the desirability to determine that the columnar strength is sufficient for the pole being constructed. This will occur when a significant vertical load "P" is imposed on the pole. Readily recognizable vertical loads occur when large lights, signs or transformers, either singly or in groups, are supported symmetrically on the pole, but perhaps the most significant vertical loading is applied to utility poles by the use of guy wires. When vertical loading is considered, it has been found that the cantilever deflection load and the critical column load can generally be equated inasmuch as both of these are proportional to the product to the modulus of elasticity "E" multiplied by the moment of inertia "I". A corrective factor must be included, however, as will be hereinafter explained.

The wind load bearing capability of an FRP utility pole may be calculated by using the results from the cantilever load test specified in ANSI C136.20-1990. The test data consists of the distance $L_A$ from the ground level "G" to the tip 18 of the pole 10, and the load at which the pole fails. All of the poles fail in buckling on the compression-stressed side of the pole. This failure by buckling suggests that the poles may behave as columns, which fail in compressive buckling during cantilever load testing. Using column theory one is able to predict the failure load of the FRP poles from the load and deflection data, thereby establishing a non-destructive test which can be employed mathematically to ascertain the required thickness at each incrementally located station along the pole.

One can predict the deflection ($\delta$) at the end of a cantilever beam supporting a given load (in this case the rated load) by using the equation:

$$\delta = \left(\frac{F_R a^2}{6EI}\right)(a - 3L_A) \tag{5}$$

where:

$F_R$=the rated load causing the beam to deflect;

a=the distance from the plane of fixation (ground level "G") to the point where the rated load $F_R$ is applied to the beam;

$L_A$=the distance from the plane of fixation to the end of the beam;

E=the modulus of elasticity for the material from which the beam is made; and,

I=the moment of inertia for the beam section.

Column theory predicts that the critical, or projected failure, load $F_P$—i.e. i.e.: the buckling load—for a column with one end fixed and other end free can be mathematically estimated by the following equation:

$$F_P = 0.25\left(\frac{\pi}{a}\right)^2 EI \tag{6}$$

Although it might appear that the term "EI" would be exactly the same in both formulas 5 and 6 such that the solution of each equation for that term would then be equal to each other, it must be remembered that the derivation of formulas 5 and 6, as well as the operational ranges within which each is intended to function are quite different—i.e.: the formula for determining the deflection "$\delta$" falls within the elastic limit of the material, but the critical, projected failure, load $F_P$ falls outside the elastic limit. Perhaps of even greater importance, it should also be noted that FRP is not a homogeneous, isotropic material. Therefore, the flexural modulus of the FRP used in equation 5 may not be equal to the modulus used in predicting the critical load of a column. In addition; the pole is a tapered structure. As such, the "effective" moment of inertia in bending may not be equal to the "effective" moment of inertia used to predict the critical load of a column. Hence, a corrective factor "B" must be introduced when equating mathematical expressions 5 and 6 for mathematical propriety. Hence:

$$B\left(F_R \frac{a^2}{8}\right)(a - 3L_A) = 4F_P\left(\frac{a}{\pi}\right)^2 \tag{7}$$

Inasmuch as "a" equals $L_A$, because both terms represent the distance from the point of fixation (the test station) to the point at which the load is applied—the point of final fixation is ground level "G"; hence "a" consistently equals $L_A$—one may solve for $F_P$ and clear the expression $0.25\Pi^2$ into the proportionality constant, expressed as "C" in the following equation:

$$F_P = C\left(\frac{F_R}{\delta}\right)(a - 3L_A) \tag{8}$$

From equation (7)

$$C = \frac{B\pi^2}{4} \tag{9}$$

According to equation (8)—if one can determine the constant "C" and if one knows: the length of the beam $L_A$; the distance "a" from the ground level "G" to the point at which the load "F" is applied; as well as the deflection $\delta$—one can mathematically predict the projected failure load $F_P$. The terms "a", $L_A$, $F_R$ and $\delta$ are readily ascertained. However, one must determine "C" from test data.

For the purposes of the present invention, the evaluation of "C" was accomplished by using pile load and deflection test data. That analysis used the deflection at a test load of 300 pounds to evaluate "C." Using that test load minimized the affects of inconsistencies in the deflection measurements at low loads, and it also minimized the effects of the ground line strap stretching in the test facility.

To identify a linear relationship between the load/deflection parameter and the failure load, data for "a", $L_A$ and the deflection $\delta$ resulting from a three hundred (300) pound load was entered into a spreadsheet, and the load-deflection parameter was computed. A linear regression analysis of the failure load versus the load-deflection parameter, extending through the origin of a graphical representation thereof, yielded a value of –0.0843 for "C" within a standard error estimate of 270 pounds for the failure load and a correlation coefficient ($r^2$) of 0.94 (unity being a perfect data fit). It must be understood that the deflection test data was based on the use of glass reinforcing fiber having a "yield" of two hundred, fifty (250) yards of the glass filament from one pound of glass. It should be recognized that different fibers or even glass fibers produced at a different yield rate might result in a different value of "C". The results of the calculations confirmed the approach described herein to manufacture hollow, tapered utility poles within the concept of the present invention.

In summary, after the wall thickness to the inner diameter ratio and the stress checks have been completed at each test station along the length of the pole above ground, the tip deflection $\delta$ at the rated load is determined, and the projected failure load $F_P$ at that deflection $\delta$ is calculated in accordance with formula (8). If the rated load $F_R$ is not less than the projected failure load $F_P$ and if the projected failure load $F_P$ is not less than the rated load $F_R$ plus a preselected constant value $\epsilon$, the maximum allowable stress $S_{max}$ is revised.

Before detailing an explanation as to how the maximum allowable stress is revised, it should be explained that in the comparison of the rated load to the projected failure load, the rated load $F_R$ is the published horizontal load for the class of pole being manufactured plus a value based on the standard error estimate of two hundred, seventy (270) pounds, increased to four hundred (400) pounds for an additional margin of safety. Hence, if the class of pole is rated as withstanding a horizontal load of two thousand four hundred (2,400) pounds, the rated load would be two thousand, eight hundred (2,800) pounds. The factor $\epsilon$ is a minimum constant which may be on the order of about one hundred (100) pounds in order to assure the spread necessary to allow either a "yes" or a "no" response to the question of whether $F_R<F_P<F_R+\epsilon$.

In the situation where the maximum allowable stress $S_{max}$ requires revision, a "no" answer will result and then one must ascertain whether the incremental stress $S_{incr}$ should be added to the then existing value for $S_{max}$ or be subtracted therefrom. That determination is done by evaluating whether:

$$\frac{(F_R-F_P)_{i-1}}{(F_R-F_P)_i} < 0 \quad (10)$$

where "i" is the current iteration of the calculations to evaluate tip deflection at the rated load $F_R$ as well as to determine the projected failure load $F_P$ at that deflection. Hence, the expression "i–1" designates the previous iteration. A counter may be incorporated in the computer-modelling program to identify the successive iterations.

On the first run of the computer-modelling program there is no "i–1" iteration, and the stated expression (10) will, therefore, provide the computer with zero for an answer inasmuch as dividing zero by any value results in an answer of zero.

In either event, the expression (10) would result in a number greater than, or equal to, zero so the "no" branch of the flow chart is followed, and a new $S_{max}$ will be determined by adding the current incremental value $S_{incr}$ to the current, or original, $S_{max}$. Inasmuch as the initially set incremental stress value was designated as a minus number, the new maximum allowable stress $S_{max}$ will be the previous maximum allowable stress minus the incremental stress $S_{incr}$. That new maximum stress $S_{max}$ will then be reset in the top box of the flow chart, and the calculations described in the flow chart are successively recalculated. On the second, and all successive, iterations the test delineated as mathematical expression (10) is recalculated, and a current as well as a previous value for $F_R$ and $F_P$ exists to provide a numerical value for the mathematical test expression identified as formula (10). The iterations are continued and new $S_{max}$ are reset at the conclusion of each cycle.

At some iteration the test ratio established by expression (10) becomes less than zero so the "yes" branch of the flow chart is followed. When the "yes" answer is obtained, the incremental stress $S_{incr}$ is decreased by one half (½), and the sign of the incremental stress $S_{incr}$ is changed.

The aforesaid modelling formulas are continued at all above ground level "G" stations 26 until the test $F_R<F_P<F_R+\epsilon$ is answered "yes". At that point the below ground level evaluation occurs. Under normal circumstances that portion of the pole which extends below ground level is not changed, and the program is terminated. However, an evaluation step is provided in the event some special circumstances require special treatment.

When the computer-modelling of the pole 10 is completed, the resulting pole configuration, for example, may be as follows. At test station $26_A$, the moment of inertia is a function of the diameters $d_{o1}$ and $d_{i1}$ of the circuit $16_A$ which comprises passes $24A_1$ and $24B_2$, and the distance c is equal to $c_1$. It will be appreciated that the diameters will continue to increase due to the taper of the mandrel and the thickness varies as a result of wrapping the resin-coated, fiber strands on a tapered mandrel. As such, the calculations continue until the pole is completed.

At test station $26_B$, the moment of inertia is a function of the diameters $d_{o2}$ and $d_{i2}$ and the distance c is equal to $c_2$. In any event, at test station $26_B$ at least one of the tests failed, and circuit $16_B$—comprising two passes $24A_2$ and $24B_2$—was added.

Circuit $16_B$ need not extend beyond test station $26_B$, and layer $14_A$ thus constitutes only that portion of the circuit $16_A$ that extends from test station $26_B$ to and including the tip portion 18.

At test station $26_C$, diameters $d_{o3}$ and $d_{i3}$ were used, as was $c_3$. However, no additional circuit 16 was required. On the other hand, at test station $26_D$—where diameters $d_{o4}$ and $d_{i4}$ were used, as was $c_4$, to calculate the mathematical tests—an additional circuit $16_c$ comprising passes $24A_3$ and $24B_3$ was required.

At test station $26_E$, however, all tests continued to pass and no further circuit 16 was required. Accordingly, the pole 10 thus has a first layer $14_A$ which extends from the tip portion 18 to test station $26_A$; a second layer $14_B$ that extends between test stations $26_B$ and $26_D$; and, a third layer $14_c$ that extends from test station $26_D$ to the butt portion 22.

By utilizing a conventional digital computer programmed to calculate the required values, the process is simplified and can be completed in an acceptable time period for different length poles and for various loads. The loads will vary due to the situation in which the pole will be used. For example, the pole may support lights, signs, transformers—or be stabilized by guy wires—all of which might impose a cantilever load. It is also necessary to consider the prevailing winds and the maximum possible wind load that might occur at the location the pole is to occupy.

Figure 15:
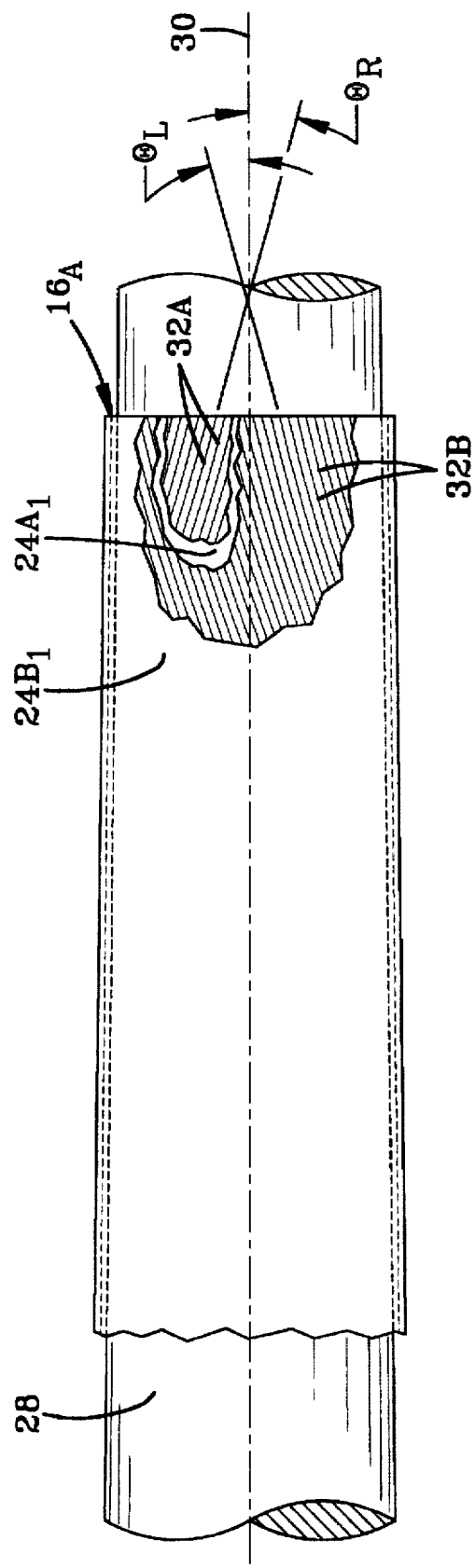
FIG. 15 is a diagrammatic representation of the tip portion of a utility pole assembled on a mandrel.

After the mathematical, computer-modelling of the pole is completed, the pole is actually fabricated in conformity with the number and lengths of the circuits determined by the modelling technique. As seen in FIG. 15, the circuits 16 of the resin-coated, fiber reinforcing strands 32 are laid-up on a mandrel 28 which may be rotatably supported on its longitudinal axis 30. The first pass 24A of each circuit 16 is placed on the mandrel 28 such that the fiber reinforcing strands 32A are disposed at a right hand helical angle $\theta_R$ while the second pass 24B of each circuit 16 is placed on the mandrel 28 such that the fiber reinforcing strands 32B are disposed at a left hand helical angle $\theta_L$. Preferably the angles $\theta_R$ and $\theta_L$ have the same absolute value but are opposite in direction. Successive circuits will apply the resin-coated, reinforcing strands 32 at comparable helical angles. A value of fifteen degrees (15°) has been found to be acceptable for most conditions to which a utility pole will be subjected.

Inasmuch as the pole structure can be determined by computer-modelling, without actually constructing the pole, the inner circuits applied to the mandrel 28 can be the shorter circuits. Thus, one could wind the circuit $16_C$ first, and it would, therefore, be the innermost circuit. A pole made in this manner would present a generally smooth, outer surface and perhaps have a more pleasant aesthetic appearance.

The foregoing detailed description of an exemplary embodiment of the a FRP utility pole has been presented for the purposes of illustration and description. It is not intended to be exhaustive nor is it intended to limit the invention to the precise form disclosed. Obvious modifications, or variations, are possible in light of the above teachings. The embodiment was chosen and described to provide the best illustration of the principles of the invention and its practical application in order to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

While only a preferred embodiment of the present invention is disclosed, it is to be clearly understood that the same is susceptible to numerous changes apparent to one skilled in the art. Therefore, the scope of the present invention is not to be limited to the details shown and described but is intended to include all changes and modifications which come within the scope of the appended claims.

As should now be apparent, the present invention teaches that an FRP utility pole embodying the concepts of the present invention, as well as the method disclosed for making such a pole, are fully capable of achieving the objects of the invention.

We claim:

1. A utility pole having butt and tip portions made by a process comprising the steps of:

determining the length of the pole to be fabricated;

selecting a mandrel having a representative diameter and length on which to make the pole;

establishing test stations spaced incrementally from the tip portion to the butt portion;

applying resin-coated, fiber reinforcing strands over the mandrel;

determining, at each of said test stations, if the thickness-to-diameter ratio for the wall thickness of the resin-coated, fiber reinforcing strands laid on said mandrel is equal to or less than 0.015;

the step of determining if the thickness-to-diameter ratio is satisfied being accomplished at all test stations before proceeding with the remaining steps of the process;

applying additional circuits of resin-coated, reinforcing strands as are necessary to satisfy the thickness-to-diameter ratio at the first test station;

calculating the stress resistance at each of said test stations by virtue of the formula:

$$s = \frac{Mc}{I}$$

determining if the acceptable stress resistance under a predetermined load calculated at said same test station is greater than the stress resistance required for said test station;

applying additional circuits of resin-coated, reinforcing strands as are necessary to satisfy the required stress resistance at said test station before proceeding;

calculating the critical load at each of said test stations by virtue of the formula:

$$F_P = C \left( \frac{F_R}{\delta} \right) (\alpha - 3l)$$

determining if the actual loading to be applied to the pole is lower than the critical load at which the pole would buckle at said station;

adjusting the acceptable stress if the preselected, rated load is not less than the projected failure load and the rated load does not exceed the projected failure load by a predetermined margin of safety;

applying additional circuits of resin-coated, reinforcing strands as are necessary to assure that the calculated and adjusted maximum stresses satisfy the margin of safety criterion;

continuing the testing and applying steps at each test station until the pole is satisfactorily laid up on the mandrel;

curing the resin to complete the pole; and recalculating the thickness-to-diameter ratio at all test stations after any additional circuits are determined to be necessary as a result of any of the remaining steps of the process.

* * * * *

UNITED STATES PATENT AND TRADEMARK OFFICE
CERTIFICATE OF CORRECTION

PATENT NO. : 5,704,187
DATED : January 6, 1998
INVENTOR(S) : Gregory S. Hosford et al It is certified that error appears in the above-identified patent and that said Letters Patent is hereby corrected as shown below:

On the title page, item [56], insert the following:

U.S. Pat. No. 3,655,468 dated 4/11/72 to A.L. Bastone, et al
U.S. Pat. No. 3,886,024 dated 5/27/75 to V.A. Chase
U.S. Pat. No. 3,896,858 dated 7/29/75 to W.J. Whatley
U.S. Pat. No. 4,038,360 dated 9/13/77 to W. Jonda
U.S. Pat. No. 4,089,727 dated 5/16/78 to P. Hardy-The McLain
U.S. Pat. No. 4,201,823 dated 5/6/80 to L.M. Russell
U.S. Pat. No. 4,248,062 dated 2/3/81 to P.H. McLain et al
U.S. Pat. No. 4,251,036 dated 2/17/81 to P.H. McLain
U.S. Pat. No. 4.283,446 dated 8/11/81 to P.H. McLain
U.S. Pat. No. 4,381,960 dated 5/3/83 to W.H. Pinter et al
U.S. Pat. No. 4,336,868 dated 6/29/82 to H.E. Wilson et al
U.S. Pat. No. 4,622,086 dated 11/11/86 to A. Puck et al
U.S. Pat. No. 4,784,351 dated 11/15/88 to K. Eickmann
U.S. Pat. No. 4,921,557 dated 5/1/90 to W. Nakamura

UNITED STATES PATENT AND TRADEMARK OFFICE
CERTIFICATE OF CORRECTION

PATENT NO. : 5,704,187

DATED : January 6, 1998

INVENTOR(S) : Gregory S. Hosford et al

It is certified that error appears in the above-identified patent and that said Letters Patent is hereby corrected as shown below:

U.S. Pat. No. 5,028,464 dated 7/2/91 to H. Shigetoh

Signed and Sealed this

Nineteenth Day of January, 1999

Attest:

Attesting Officer

*Acting Commissioner of Patents and Trademarks*